Patented Nov. 2, 1943

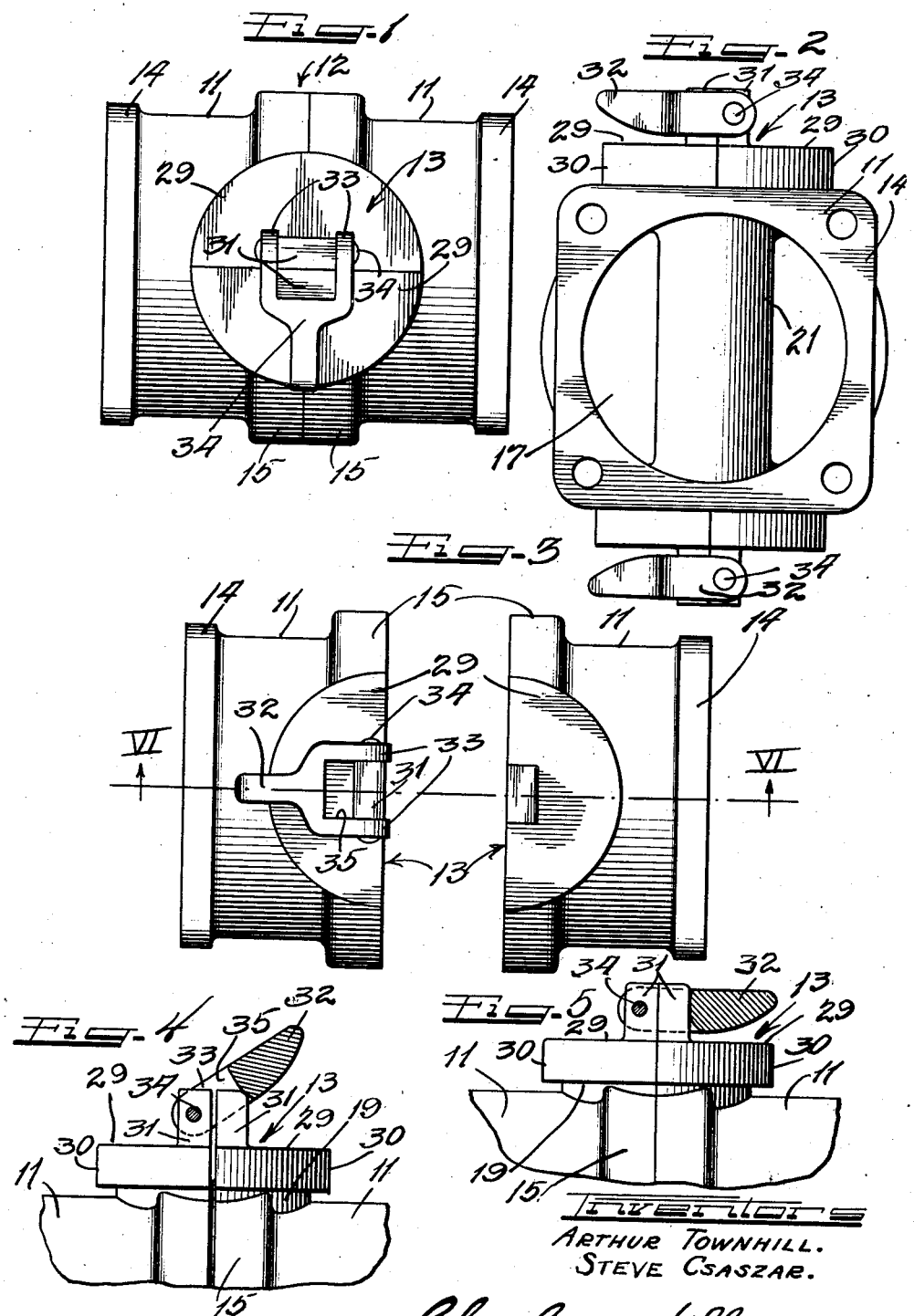

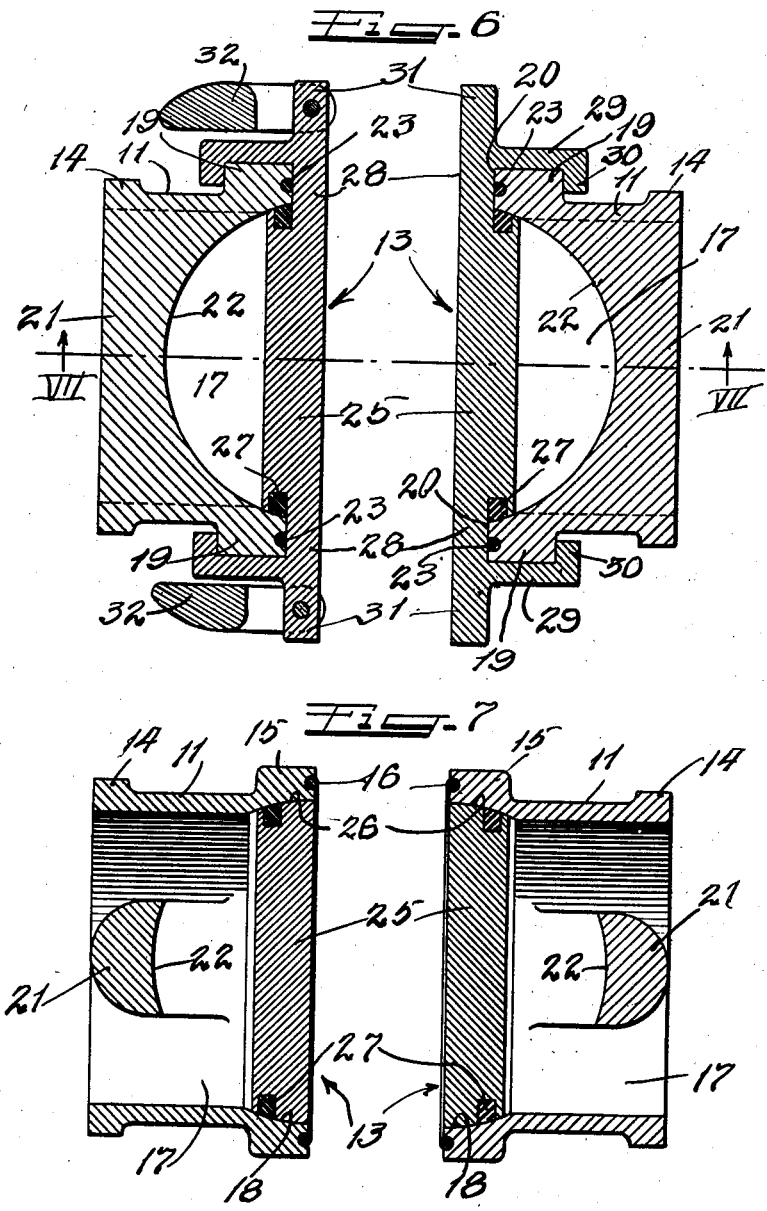

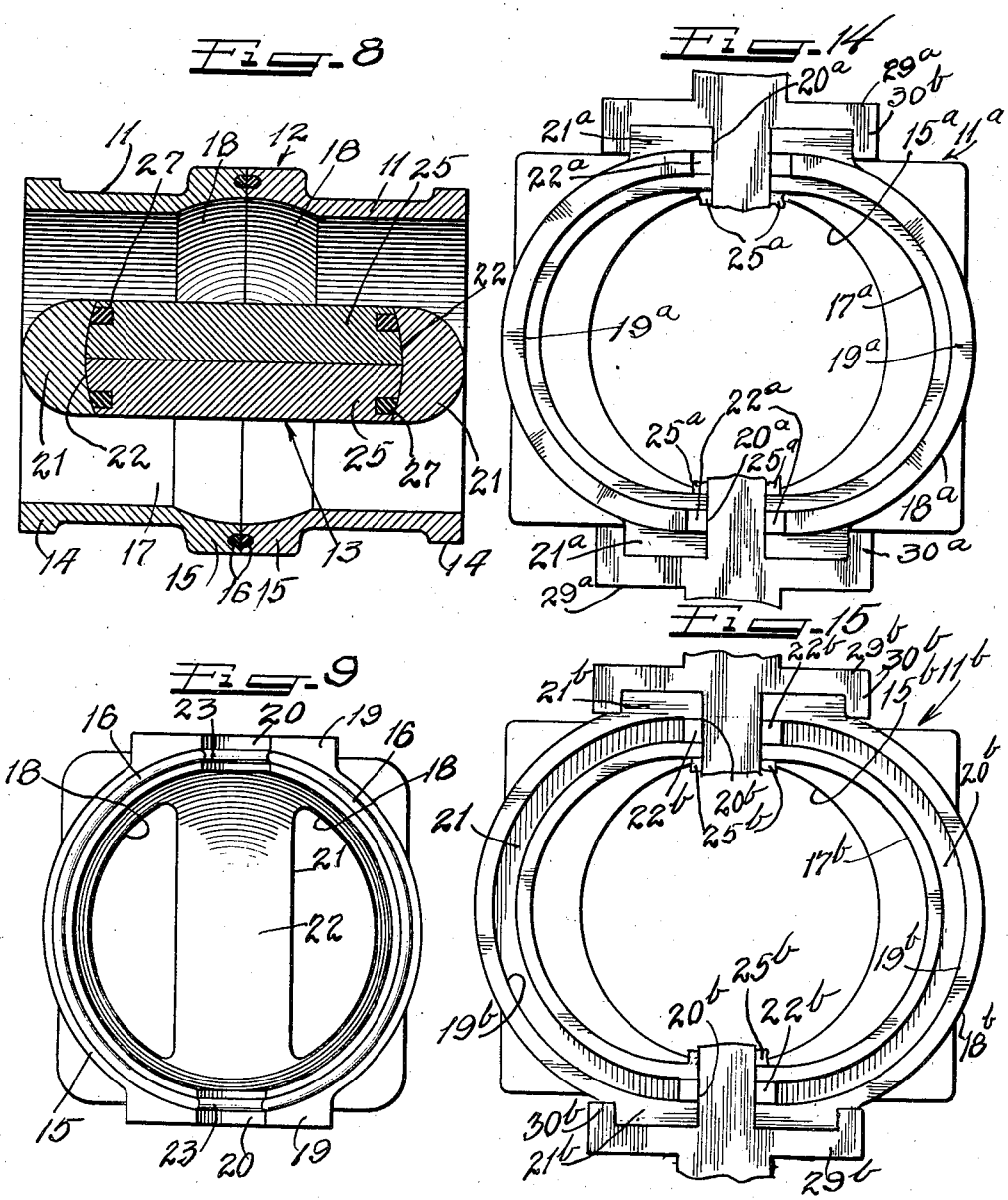

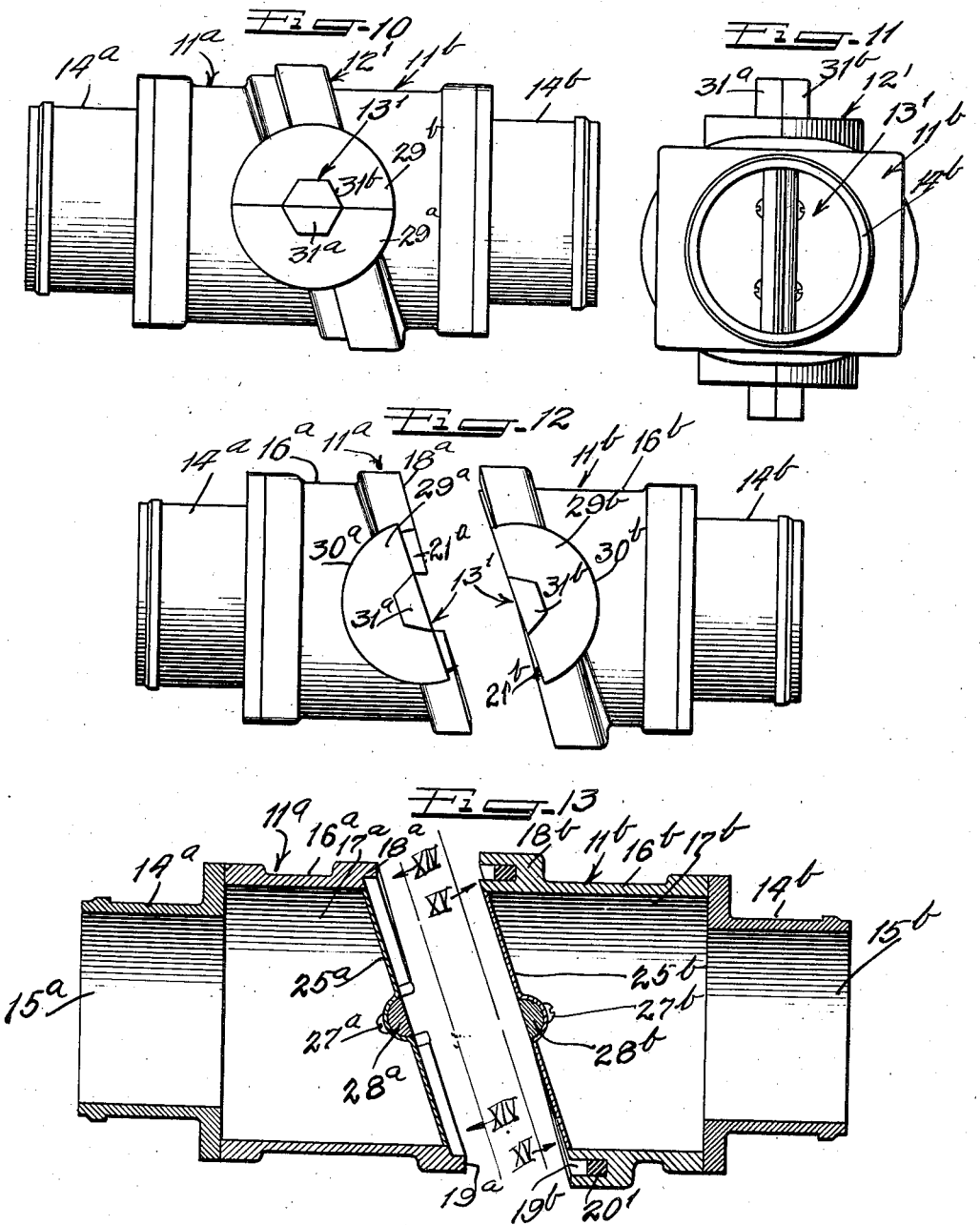

2,333,496

UNITED STATES PATENT OFFICE 2,333,496

QUICK DISCONNECT COUPLING

Arthur Townhill and Steve Csaszar, Cleveland, Ohio, assignors to Thompson Products Incorporated, Cleveland, Ohio, a corporation of Ohio Application August 5, 1942, Serial No. 453,651

12 Claims. (Cl. 284—4)

The present invention pertains to couplings and more particularly to self-sealing couplings constructed for quick and easy operation while automatically sealing the coupling parts when the same are detached from each other.

Still more specifically the invention pertains to a device for coupling together the ends of tubes, pipes, and the like to place the same in unrestricted communication when coupled together and to seal the ends thereof when uncoupled.

It is an object of this invention to provide a simple construction of coupling having a valve for placing the coupling parts in fluid flow communication and for sealing each coupling part when the coupling is broken.

Another object of this invention is to provide an improved coupling employing a split valve to act as a locking means and as a sealing means for the coupling parts when the coupling is broken.

Another and further object of this invention is to provide a coupling which will alternately couple and seal the ends of tubes, pipes, hose, and the like.

A still further object of the invention is to provide a coupling of the aforementioned type wherein the split coupling valve is cooperable with the coupling parts in a plurality of different positions at right angles to each other and for effecting a seal in each of said positions.

It should be noted that while the invention which is hereinafter described is particularly adapted for use in conjunction with fuel and air lines, such as employed in airplane engines, it should be understood that the couplings of this invention are not limited to such use and that the invention relates to couplings in general.

In accordance with the general features of this invention, there is provided a coupling comprising a pair of complementary alignable parts having ports therein for fluid flow therethrough and a multi-piece valve rotatably mounted on both of said parts to detachably connect the same, and means retaining a piece of said valve in each part for sealing the ports when the parts are disconnected.

Still other features of the invention, and as particularly exemplified by one form of the invention disclosed herein, relate to the provision of means in the complementary parts cooperable with the valve when the valve is moved to an open position to seal the pieces of the valve against the flow of fluid therebetween.

In accordance with the features of another form of the invention, there is provided a coupling wherein the coupling parts are joined on an inclined plane and wherein the valve comprises a pair of butterfly-type valves, each comprising a plate of an oval cross-section, and the two plates being movable together from an inclined, closed position to an open position inside of the coupling parts, the rotary movement of said valve being limited so that the valve is prevented from making a complete turn in the coupling parts.

Other objects and features of this invention will more fully appear from the following detailed description taken in connection with the accompanying drawings, which illustrate several embodiments thereof, and in which:

Figure 1 is a plan view of a coupling embodying the features of this invention;

Figure 2 is an end view of the structure shown in Figure 1 but turned at 90° to the end, as viewed in Figure 1;

Figure 3 is a view similar to Figure 1 showing the valve parts rotated to closed position and the coupling parts or boxes separated;

Figure 4 is a fragmentary detailed view, partly in section, illustrating the position of the cam latch on the valve parts just prior to the drawing of the two parts tightly together by the latch;

Figure 5 is a view similar to Figure 4 showing the latching cam in its latched position on the valve parts;

Figure 6 is an enlarged cross-sectional view taken on the line VI—VI of Figure 3 looking upwardly;

Figure 7 is a cross-sectional view taken on the line VII—VII of Figure 6 looking upwardly;

Figure 8 is a cross-sectional view similar to Figure 7 but showing the coupling parts in cooperation and the valve rotated to an open position in which it holds the coupling parts together, and also showing the sealing cooperation of the valve with posts in the two coupling parts;

Figure 9 is an end view of one of the coupling boxes, both of which are identical, with the valve part removed and showing the face of the coupling part that is adapted to contact and abut against the face of the other part or box;

Figure 10 is a plan view of a modified form of coupling;

Figure 11 is an end view of the coupling shown in Figure 10, but turned at 90° from the end as viewed in Figure 10;

Figure 12 is a plan view similar to Figure 10 but showing the valve parts rotated to sealed position and with the coupling boxes or parts separated;

Figure 13 is a cross-sectional view through the coupling shown in Figure 12 and illustrating how the two parts of the valve each cooperate with the associated coupling part or box in closing off the same when the coupling parts are separated;

Figure 14 is an end view of one of the coupling parts taken on the line XIV—XIV of Figure 13 looking in the direction indicated by the arrows and with the valve part removed; and Figure 15 is an end view similar to Figure 14 of the other valve part taken on the line XV—XV of Figure 13 looking in the direction indicated by the arrows.

As shown on the drawings:

The reference characters 11—11 designate the two cooperable coupling parts or boxes of our coupling and, since these parts are identical, the same reference characters are being applied to the corresponding portions of these parts. These two parts are adapted to be interlocked and held together by the parts of a valve designated generally by the reference character 13 so that the entire assembled structure forms a unitary coupling designated generally by the reference character 12.

Each of the coupling parts or boxes 11 includes a flanged end 14 suitably apertured (Figure 2) for attachment to a conduit or the like, such as a part of a fuel line of an airplane engine. The other end of the coupling part is provided with an enlargement or flange 15, which has a flat face for abutting cooperation with the corresponding face of the other coupling part or box. This face is grooved to receive a rubber sealing or packing ring 16 (Figure 9) which may be either in the form of a continuous ring or may comprise a plurality of segments.

The coupling part is formed hollow or tubular so as to have a bore 17 which terminates at one end in a counterbore 18 (Figure 7) formed inside of the enlarged flange 15. It will be perceived from Figure 7 that the counterbored surface designated by the reference character 18 is inclined and slightly curved so as to define a seat for one of the two valve parts 13 when the valve is in sealing and closed position.

It will also be perceived, particularly from Figure 9, that the enlarged flange 15 is provided at diametrically opposite points with circular bosses 19—19, each provided with a cylindrical hole 20—20. The two holes 20—20 are of a size to accommodate the stem portions of the valve 13 and in reality define bearing points for the rotary valve 13.

Each hole 20 is formed of two halves, one being in each of the two cooperating faces of the two coupling parts. Also, each hole is provided with a groove in which is disposed a section of a sealing ring 23 for sealing cooperation with the stem portions of the rotary valve (Figures 6 and 9).

Positioned in the bore 17 of each of the boxes or parts 11 is a vertical post 21 having a curved face 22 defining a seat for one half of the valve when the valve is moved to open position inside of the cooperating coupling part. It should be noted that the curved face 22 is curved both transversely so as to correspond to the transverse curvature of the outer edge of the valve 13, and also cylindrically so as to fit about the periphery of a portion of the valve 13 (Figure 6). The cylindrical characteristic of the surface 22 is clearly shown in Figure 6, and it will be appreciated that if the valve 13, when the parts are coupled, is rotated a quarter of a turn, its periphery will be brought into sealing engagement with the two cooperating cylindrical surfaces 22—22 of the two coupling parts.

As noted before, the valve designated generally by the reference character 13 comprises two identical parts with the exception of the latching means carried by one of the parts to be hereinafter described. The two parts are each designated by the reference character 25—25.

Each of the valve parts 25 is a complete circle with the exception of the stem portions 28—28 (Figure 6) extending from diametrically-opposite portions of these valve parts. Also, each part 25 has a transversely-curved surface 26 (Figure 7) of a configuration closely conforming to the curved surface 18 in the cooperating box or coupling part so that, when these surfaces are brought into register, a sealing cooperation may be established between the valve parts and the box parts. In order to establish a fluid-type seal, the periphery of the valve part is grooved and has disposed therein a rubber sealing ring 27. The manner in which this ring sealingly cooperates with the surface 18 of the box part 11 is shown in Figure 7.

As noted before, the enlarged diametrically-opposite bosses 19—19 of the boxes are provided with rubber sealing ring segments 23—23 which sealingly cooperate with the stem portions 28—28 of the valve so that a seal is not only established inside of the bores 17—17 of the coupling boxes by the rubber rings 27 but, in addition, a seal is established around the stem portions 28 of the valve.

Each stem portion 28 is provided with an integral segmental cap 29 having a lateral semicircular flange 30 extending toward the body of the box 11. These semi-circular flanges 30 are adapted to embrace the curved peripheries of the bosses 19—19 so as to hold the valve members in their respective boxes. It is also clear from Figure 6 that, by rotating each valve part 25, it is possible to bring the flanges 30 out of retaining cooperation with the bosses 19 so that the valve part can be removed from the box after the coupling has been opened.

Each cap segment 29 has extending outwardly therefrom a rectangular lug 31 cooperable with the adjoining lug on the other valve part to constitute a complete nut-like head engageable by a wrench for the purpose of turning the valve part when the boxes are coupled together.

If it is so desired, a latching mechanism may be provided for holding and camming together the cooperating lugs on the two parts. This latch element is designated generally by the reference character 32 and, if it is so desired, one may be disposed on each of the two lugs 31—31 of one of the valve parts, as shown in Figures 2 and 6.

This camming latch (Figures 3, 4, and 5) has furcations 33—33 between which is defined a space 35 of a size to receive one of the lugs 31. The latch is pivotally connected to the lug 31 by means of a suitable pin 34.

It will be appreciated that when the valve parts 25—25 are brought into juxtaposition, as shown in Figure 4, they may have an infinitesimally small spacing between them, as exaggerated in Figure 4. By pressing the cam latch 32 downwardly from the position shown in Figure 4 to that shown in Figure 5, it is possible to wedge tightly together the adjoining lugs 31—31 of the two valve parts 25—25, thus latching the valve parts in wedged and tight engagement.

The assembly of the valve and coupling parts in the above described form of our invention is a relatively simple proposition. To effect this, a valve part 25 is positioned opposite to the curved surface 26 of the flange end 15 of one of the boxes 11 and is then turned so as to bring the segmental caps 29 into locking cooperation with the opposite bosses 19—19. That is to say, as the valve part is rotated, each flange 30 is brought into register with the peripheral portion of the semi-circular boss 19, and continued rotation brings the flange 30 into concentric retaining relation with the peripheral portion of the boss 19.

When in this position, each of the valve parts 25 will be in sealing cooperation with the curved counterbored surface 18, as shown in Figures 6 and 7. It should be perceived that the curved surface 18 is of such a configuration that it, in reality, constitutes a continuation of the cylindrically-curved surface 22 on the post 21 in the corresponding valve box 11 (Figure 9).

When the valve parts 25 are in the sealing position shown in Figure 6, they close off and seal the ends of the bores 17—17 in the two boxes so that the ends of the conduits connected to these boxes are also sealed when the coupling is thus disconnected.

To connect the coupling together, the valve parts 25 (Figure 6) are brought into contiguous relation by moving the boxes and valve parts bodily together. Thereafter, the latching cams 32 are brought into latched relationship with the lugs 31—31, thus locking the two valve parts together.

When it is desired to open the valve, it is turned on its vertical axis and by turning the valve a quarter of a turn, its curved periphery may be brought into sealing engagement with the cylindrical curved surfaces 22—22 (Figure 8) of the spaced posts 21—21 in the two valve boxes 11—11. When in this position, the sealing rings 27—27 of the valve parts establish a seal between the valve and the posts 21—21 so that fluid flowing through the bores 17—17 of the coupling does not have an opportunity to get between the abutting faces of the two valve parts 25—25.

From the foregoing it is clear that we have provided a coupling box and valve part assembly comprising primarily four parts, in which the parts can always be maintained in sealing relation irrespective of whether the valve is open or closed and irrespective of whether the valve boxes are separated, as in the position shown in Figure 6.

In Figures 10 to 15, inclusive, there is illustrated a modified form of coupling which differs from the previously described one principally in that it does not include the posts 21—21 and in that the boxes and valve parts are joined together on an inclined plane and not at right angles to the length of the coupling as is true in the first form.

In this form of the invention, the two coupling parts or boxes are designated by the reference characters 11a and 11b cooperable with a rotary two-piece valve 13' and which parts, when assembled together, provide a complete coupling 12'.

Each of the parts 11a and 11b includes a tubular extension 14a—14b having a bore 15a—15b (Figure 13). The extension 14a is suitably clamped or bolted to the main body of the coupling part 16a. Similarly, the tubular extension 14b is suitably clamped or bolted to the main body part 16b of the coupling part 11b (Figure 13). The two parts or portions 16a and 16b are tubular, and each has a bore 17a—17b.

The box 11a has a circular enlargement or flange 18a provided with a circular segmental lug 19a adapted to telescope circular segmental grooves 19b in the adjoining face of the coupling part 11b (Figures 13, 14, and 15). The reason the groove 19b and the tongue or lug 19a are described as segmental is because they are interrupted at the diametrically-opposite portions of the valve 13' where the stems extend through the cooperating portions of the boxes. In reality, the cooperating faces of the two boxes 11a and 11b are of an oval configuration rather than of a true circle, as is evident from Figures 14 and 15. They are, however, curved and for that reason have been referred to as being circular.

The flange 18a of the coupling part 11a is provided at diametrically-opposite points with semi-circular-like bosses 21a—21a (Figure 14) in the center of which are valve stem-receiving bores or holes 20a—20a. Similarly, the valve part 11b (Figure 15) has an enlarged flange 18b which has the groove 19b and carries the rubber sealing ring 20' at the bottom of the groove (Figure 13). This enlarged flange 18b is provided at diametrically-opposite points with semi-circular bosses 21b—21b, each of which is provided with a central hole 20b for receiving a portion of the valve stem. Each of the holes 20a is provided with a semi-circular ring-type sealing gasket 22a, and each of the holes 20b is provided with a similar gasket 22b. These gaskets on the two cooperating parts of the box, when the parts are brought together, establish a continuous seal about the stem portions of the rotary valve 13'.

The valve 13' includes two cooperable plates 25a—25b, one for each of the boxes 11a—11b. These valves are of an oval configuration so as to seal the oval ends of the bores, 17a—17b shown in Figures 14 and 15, when the valve is in a closed position.

Each valve part 25a—25b is of the so-called butterfly type and is suitably secured as by means of screws 27a—27b to the valve stem portions 28a—28b (Figure 13). The two stems when brought together have a circular cross-section and have end portions adapted to fit in the bores 20a—20a and 20b—20b of the cooperating boxes 11a and 11b.

The construction of the ends of the valve parts 25a—25b is much the same as in the first described form of the invention and hence has not been illustrated in as much detail as in the case of the first form of the invention.

Each valve part 25a—25b is provided at its extremity with segmental caps 29a—29b having semi-circular flanges 30a—30b for cooperation with bosses 21a—21a and 21b—21b on the box parts 11a and 11b. This coaction is the same as in the case of the previously described form of the invention. Also, the caps are provided with cooperable lugs 31a—31a and 31b—31b which, when brought together, define a pair of nut-like extremities which may be engaged by a wrench handle for the purpose of turning the valve. It should be noted that, in this case, the parts 31a—31b when brought together define a hexagon instead of a square, as in the first form of the invention.

The position of the parts shown in Figure 13 corresponds roughly with that of the parts shown in Figure 6 of the first described form of the invention. In this position, the coupling boxes 11a—11b have been separated and the ends of the bores in the coupling boxes are sealed by the valve parts 25a—25b, which are illustrated in closed positions.

The parts may be brought together and interlocked in the same way as in the first form of the invention by the proper turning of the valve 13'. The turning of this valve results in the part 25a being brought into the box 11b and the part 25b being brought into the box 11a. When the valve is moved toward a horizontal position, as shown in Figure 13, or, in other words, is turned to the left, it is moved into an open position with the parts coupled together and the bores 17a and 17b in intercommunication.

The valve 13', comprising the parts 25a and 25b, as best shown in Figure 13, cannot be revolved a complete turn since its periphery will strike against the inner surface of the box portion 16b which prevents it from being turned completely around. It will further be appreciated that, when the parts 25a and 25b are in the position shown in Figure 13, they cannot be moved to any further extent to the right by reason of the abutment of the peripheral portions of the valve against the parts or portions 16a and 16b.

With the boxes 11a and 11b joined on a bias, a greater valve area is enabled than when the valve is disposed in a vertical position relative to the length of the box, as in Figure 6. Also this construction eliminates the necessity for a spherical valve seat.

From the foregoing description, it is clear that in both forms of the invention, a quarter turn rotation of the valve not only places the passageways of the coupling boxes in connected relation but also places the passageways of each box in full fluid communication. Reverse quarter turn rotation of the plug valve disconnects the coupling boxes and seals the passageways of these boxes so that leakage out of the conduit ends to which the boxes may be attached is prevented. The first described form of the invention is particularly adaped for use in connection with fuel conduits such as are used in airplanes. The second form has been developed with a view of using it in conjunction with the conducting of air.

Each coupling box can be cast or forged in one piece, and likewise each valve part can be cast or forged in one piece so that the total assembly outside of the seals is of a minimum number of parts.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A coupling comprising a pair of complementary parts having ports therein for fluid flow therethrough, a multi-piece valve rotatably mounted in both of said parts to detachably connect the same, and means retaining a piece of said valve in each part for sealing the ports when the parts are disconnected, said valve having a two-part stem projecting to the exterior of said complementary parts and provided with means constructed and arranged to interlock the valve to the complementary parts upon rotation of each of the valve pieces into the associated coupling parts.

2. A coupling comprising a pair of cooperable parts having ports therein for fluid flow therethrough, a multi-piece valve rotatably mounted in both of said parts to detachably connect the same, means retaining a piece of said valve in each part for sealing the ports when the parts are disconnected, and means inside said coupling parts defining a seat for said valve cooperable with said valve when it is rotated into a position to connect said ports, said means comprising a pair of segmental cylindrical sections, one in each of said coupling parts.

3. A coupling comprising a pair of cooperable parts having ports therein for fluid flow therethrough, a multi-piece valve rotatably mounted in both of said parts to detachably connect the same, means retaining a piece of said valve in each part for sealing the ports when the parts are disconnected, and latch means for latching said pieces of the valve in tight engagement with each other so that they may be rotated as a unit to connect said coupling parts together and also to establish communication between said ports.

4. A coupling comprising a pair of complementary boxes, a split plug rotatably mounted in said boxes to detachably connect the same, and means retaining a portion of the plug in each box to seal each box when the plug is rotated for detaching the boxes, said split plug comprising two sections flat on their sides and transversely curved on their outer peripheries so as to conform to a segment of a cylindrical surface.

5. A coupling comprising a pair of complementary boxes, a split plug rotatably mounted in said boxes to detachably connect the same, and means retaining a portion of the plug in each box to seal each box when the plug is rotated for detaching the boxes, said split plug comprising two sections flat on their sides and transversely curved on their outer peripheries so as to conform to a segment of a cylindrical surface, said plug also including a stem portion extending between said boxes to the exterior thereof and rotatably journalled in confronting faces of said boxes, said stem having at its exterior end means affording a gripping surface for rotating the plug.

6. A coupling comprising a pair of complementary coupling boxes, a split plug rotatably mounted in said boxes to detachably connect the same, means retaining a portion of the plug in each box to seal each box when the plug is rotated for detaching the boxes, said plug comprising two flat-sided members with curved peripheral portions sealingly cooperable with said boxes, and means on the exterior of the boxes connected to said plug for interlocking the plug to said boxes.

7. A coupling comprising a pair of cooperable coupling boxes, a split valve plug rotatably mounted in said boxes to detachably connect the same, means retaining a portion of the plug in each box to seal each box when the plug is rotated for detaching the boxes, and means in each of said boxes cooperable with said valve plug when the same is rotated to unseal said boxes, said latter means sealingly cooperating with said plug in the path of the flow of fluid through the coupling and at substantially right angles to the position of the plug when it seals said boxes as aforesaid.

8. A coupling comprising a pair of complementary coupling boxes, a split valve plug rotatably mounted in said boxes to detachably connect the same, said boxes having inclined registering faces to be joined on a plane inclined relative to the length of the coupling, and means retaining a portion of the plug valve in each box to seal each box when the plug is rotated for detaching the boxes.

9. A coupling comprising a pair of complementary parts having ports therein for fluid flow therethrough, a multi-piece valve rotatably mounted in both of said parts to detachably connect the same, said valve and said parts being joined together in an inclined plane relative to the direction of fluid through the coupling, and means retaining a piece of each valve in each part for sealing the ports when the parts are disconnected.

10. A coupling comprising a pair of cooperable parts having ports therein for fluid flow therethrough, a valve rotatably mounted in both of said parts to detachably connect the same, said parts having a joint in a plane inclined transversely through the coupling, and means retaining a portion of said valve in each part for sealing the ports when the parts are disconnected.

11. In a coupling comprising a pair of cooperable parts having ports therein for fluid flow therethrough, a multi-piece valve rotatably mounted in both of said parts to detachably connect the same, said parts having mating and registering oval-shaped surfaces with a hole therethrough, and said valve being disposed in the hole and likewise being of an oval shape, and means retaining a piece of said valve in each part for sealing their ports when the parts are disconnected.

12. A coupling comprising a pair of complementary parts having ports therein for fluid flow therethrough, a multi-piece valve rotatably mounted in both of said parts for detachably connecting the same, said valve having a stem extending between said parts to the exterior thereof, said coupling parts having sealing means about said stem, and means cooperating with said stem on the exterior of said coupling for retaining a piece of said valve in each part for sealing the ports when the parts are disconnected.

ARTHUR TOWNHILL.
STEVE CSASZAR.